R. LONG.
Bridge.

No. 8,959. Reissued Nov. 4, 1879.

Witnesses:
W. B. Masson
E. E. Masson

Inventor
Richard Long
J. C. Woodward, atty.

N. PETERS, PHOTO-LITHOGRAPHER, WASHINGTON, D. C.

UNITED STATES PATENT OFFICE.

RICHARD LONG, OF IOWA CITY, IOWA.

IMPROVEMENT IN BRIDGES.

Specification forming part of Letters Patent No. 146,397, dated January 13, 1874; Reissue No. 8,959, dated November 4, 1879; application filed March 24, 1879.

*To all whom it may concern:*

Be it known that I, RICHARD LONG, formerly of Stelapolis, in the county of Iowa, but now of Iowa City, in the county of Johnson, in the State of Iowa, have invented certain new, useful, and important Improvements in Bridges, as described in this specification.

Figure 1:
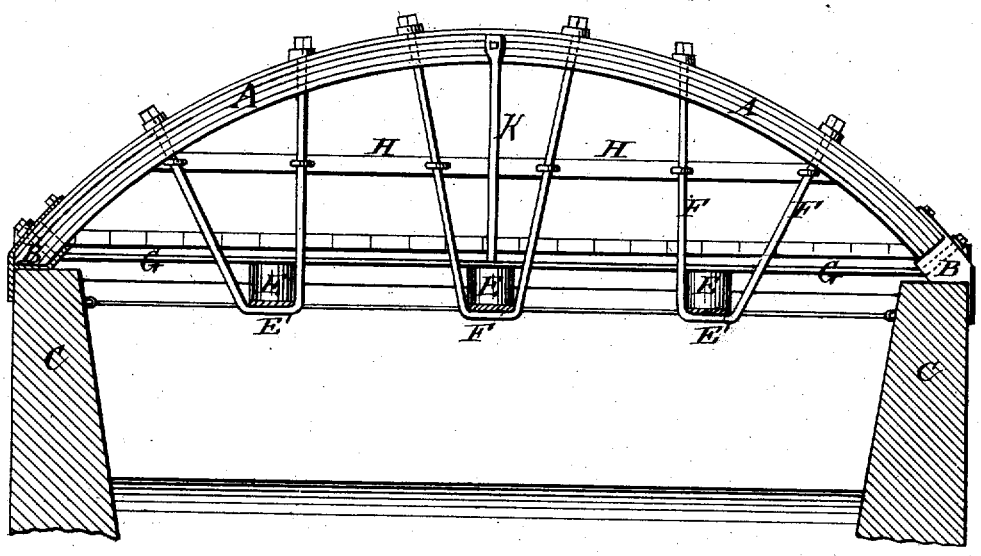
Figure 2:
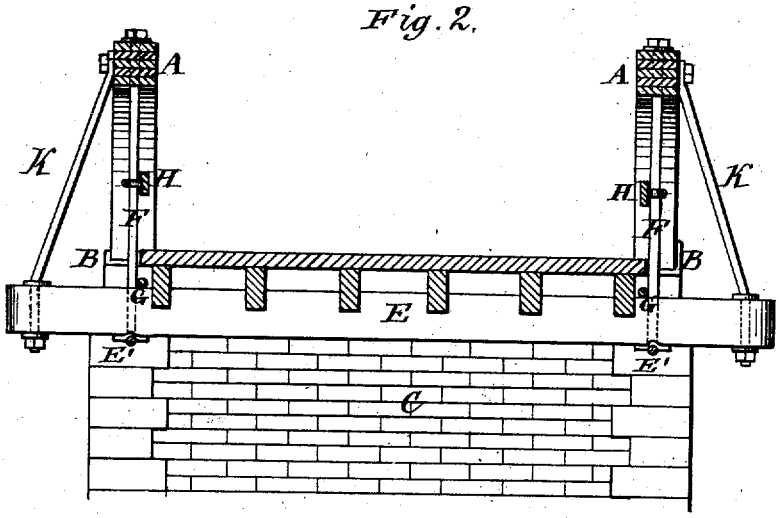

Figure 1 is a side elevation of a bridge with one span involving my improvements. Fig. 2 is a cross-section of the same through the middle of the arch.

As an improvement in bridges, my invention consists in stirrups suspended from arches, and carrying cross-beams, which support a roadway, together with longitudinal stay-rods, which connect the ends of the arches, whereby sills are dispensed with.

In the construction of bridge shown, A represents an arch, preferably of bent lumber of suitable strength and size, and covered with roofing, to be fully protected against the weather. Two or more arches may be used side by side, with roadways between them, and there may be a succession of arches, according to the length of the bridge. The ends of the arches rest in shoes B upon abutments C. The ends of each arch are rigidly connected by a stay-rod, G, to support the arch against strain. The cross-beams E are supported by stirrups F, suspended from the arches. The legs of the stirrups diverge from the cross-beams to the arch to equalize the strain upon the arch. The sleepers and planking are placed on the cross-beams. Brace-rods K may be used.

The details of construction may be varied from those set forth without departing from the principle of my invention.

I claim—

As an improvement in bridges, stirrups suspended from arches, and carrying cross-beams, which support a roadway, together with longitudinal stay-rods, which connect the ends of the arches, substantially as described.

In testimony whereof I hereunto subscribe my signature, in the presence of two attesting witnesses, at Iowa City, in the county of Johnson, in the State of Iowa, this the 7th day of February, A. D. 1879.

RICHARD LONG.

Witnesses:
EMERY BRADWAY,
GEO. W. BALL.